(12) United States Patent
Chikami et al.

(10) Patent No.: US 10,345,023 B2
(45) Date of Patent: Jul. 9, 2019

(54) TEMPERATURE-ADJUSTING FLUID SUPPLY APPARATUS

(71) Applicants: DAIKIN INDUSTRIES, LTD., Osaka-shi, Osaka (JP); DAIKIN EUROPE N.V., Ostend (BE)

(72) Inventors: Hideo Chikami, Ostend (BE); Wim Vansteenkiste, Ostend (BE)

(73) Assignees: DAIKIN INDUSTRIES, LTD., Osaka (JP); DAIKIN EUROPE N.V., Ostend (BE)

( * ) Notice: Subject to any disclaimer, the term of this patent is extended or adjusted under 35 U.S.C. 154(b) by 0 days.

(21) Appl. No.: 15/576,065

(22) PCT Filed: May 20, 2016

(86) PCT No.: PCT/JP2016/064989
§ 371 (c)(1),
(2) Date: Nov. 21, 2017

(87) PCT Pub. No.: WO2016/190232
PCT Pub. Date: Dec. 1, 2016

(65) Prior Publication Data
US 2018/0156511 A1   Jun. 7, 2018

(30) Foreign Application Priority Data
May 22, 2015   (JP) ................. 2015-104965

(51) Int. Cl.
*F25B 13/00*   (2006.01)
*F25B 49/02*   (2006.01)
(Continued)

(52) U.S. Cl.
CPC ............ *F25B 49/02* (2013.01); *F24D 3/08* (2013.01); *F24D 3/18* (2013.01); *F24D 17/02* (2013.01);
(Continued)

(58) Field of Classification Search
CPC ............ F25B 2700/13; F25B 2700/135; F25B 2700/1351; F25B 2700/21171; F25B 2700/21161; F25B 2600/13; F24F 11/85
(Continued)

(56) References Cited

U.S. PATENT DOCUMENTS 4,382,382 A * 5/1983 Wang ..................... G01F 23/243
340/620
2007/0089853 A1 * 4/2007 Nomoto .............. G03F 7/70858
165/65

FOREIGN PATENT DOCUMENTS

JP   H0894406 A *   9/1994
JP   2006-112652 A   4/2006
(Continued)

OTHER PUBLICATIONS

International Search Report for PCT/JP2016/064989 (PCT/ISA/210) dated Aug. 9, 2016.
(Continued)

*Primary Examiner* — Keith M Raymond
*Assistant Examiner* — Nael N Babaa
(74) *Attorney, Agent, or Firm* — Birch, Stewart, Kolasch & Birch, LLP (57) ABSTRACT

Provided is a temperature-adjusting fluid supply apparatus that causes a fluid for temperature adjustment to be circulated between a heat exchanger that transfers heat supplied from a refrigerant to the fluid, and an object to be adjusted for temperature that uses the heat of the fluid, the temperature-adjusting fluid supply apparatus being able to prevent the fluid from freezing. A temperature-adjusting fluid supply apparatus is provided with a heat exchanger that transfers heat supplied from a refrigerant to a fluid for temperature adjustment, a supply tube through which the fluid flows from the heat exchanger toward an object to be adjusted for temperature, a return tube through which the fluid returning
(Continued)

from the object to be adjusted for temperature flows, a flow rate adjustable pump, a flow sensor, a flow switch, a temperature sensor, and a control part. The flow switch, in comparison with the flow sensor, is able to detect flow rate changes with coarser precision, and is less affected in detection accuracy by viscosity changes in the fluid. On the basis of the temperature of the fluid detected by the temperature sensor, the control part switches between pump control based on the detection results of the flow sensor and pump control based on the detection results of the flow switch.

10 Claims, 2 Drawing Sheets

(51) Int. Cl.
| | |
|---|---|
| *F24H 4/02* | (2006.01) |
| *F25B 1/00* | (2006.01) |
| *F24F 11/89* | (2018.01) |
| *F24H 9/20* | (2006.01) |
| *F24D 3/08* | (2006.01) |
| *F24D 3/18* | (2006.01) |
| *F24D 17/02* | (2006.01) |
| *F24D 19/10* | (2006.01) |
| *F24F 11/85* | (2018.01) |
| *F24F 140/20* | (2018.01) |

(52) U.S. Cl.
CPC .......... *F24D 19/1054* (2013.01); *F24F 11/89* (2018.01); *F24H 4/02* (2013.01); *F24H 9/2007* (2013.01); *F25B 1/00* (2013.01); *F25B 13/00* (2013.01); *F24D 2220/044* (2013.01); *F24F 11/85* (2018.01); *F24F 2140/20* (2018.01); *F25B 2313/004* (2013.01); *F25B 2313/0315* (2013.01); *F25B 2600/13* (2013.01); *F25B 2700/13* (2013.01); *F25B 2700/135* (2013.01); *F25B 2700/1351* (2013.01); *F25B 2700/21171* (2013.01); *Y02B 30/12* (2013.01)

(58) Field of Classification Search
USPC ........................................................ 165/295
See application file for complete search history.

(56) References Cited

FOREIGN PATENT DOCUMENTS

| | | |
|---|---|---|
| JP | 2009-127918 A | 6/2009 |
| JP | 2010-144963 A | 7/2010 |
| JP | 2013-032896 A | 2/2013 |
| JP | 2013-104601 A | 5/2013 |
| JP | 2013-190162 A | 9/2013 |

OTHER PUBLICATIONS

Extended European Seach Report issued in the corresponding European Application No. 16799937.4, dated Jun. 4, 2018.

* cited by examiner

TEMPERATURE-ADJUSTING FLUID SUPPLY APPARATUS

TECHNICAL FIELD

The present invention relates to a temperature-adjusting fluid supply apparatus. The present invention particularly relates to a temperature-adjusting fluid supply apparatus in which a fluid for temperature adjustment is sent from a heat exchanger, which transfers heat supplied from a refrigerant to the fluid, to an object to be adjusted for temperature that uses the heat of the fluid, and fluid returning from the object to be adjusted for temperature is received and guided again to the heat exchanger.

BACKGROUND ART

In the prior art, temperature-adjusting fluid supply apparatuses are known in which a fluid for temperature adjustment is sent from a heat exchanger, which transfers heat supplied from a refrigerant to the fluid, to an object to be adjusted for temperature that uses the heat of the fluid, and fluid returning from the object to be adjusted for temperature is received and guided again to the heat exchanger. For example, Patent Literature 1 (Japanese Laid-open Patent Application No. 2010-144963) discloses a temperature-adjusting fluid supply apparatus in which a fluid that has exchanged heat with a refrigerant in a heat exchanger is sent to an object to be adjusted for temperature (an air conditioner) installed indoors.

In such a temperature-adjusting fluid supply apparatus, a flow rate adjustable pump is sometimes used to adjust the flow rate of the fluid according to, inter alia, the thermal load on the object to be adjusted for temperature. When a flow rate adjustable pump is used, the flow rate of the fluid is detected by a flow rate sensor and the pump is controlled based on the detection results, as in, e.g., Patent Literature 1 (Japanese Laid-open Patent Application No. 2010-144963).

SUMMARY OF THE INVENTION

Technical Problem

The fluid used in the temperature-adjusting fluid supply apparatus generally increases in viscosity due to decreases in temperature. Particularly, when brine is used, the viscosity increases at a comparatively high magnitude due to temperature decreases.

Therefore, with a normal flow rate sensor, there is a possibility that flow rate detection errors will be large when the fluid temperature has decreased due to, for example, the conditions in which the apparatus is used, and that the flow rate of the fluid will be detected as being greater than the actual flow rate. When the pump is controlled based on these detection results and the fluid temperature decreases, there is a risk that the amount of fluid circulating between the heat exchanger and the object to be adjusted for temperature will be less than the target amount, and that the fluid in the pipes will freeze.

An object of the present invention is to provide a temperature-adjusting fluid supply apparatus that, using a flow rate adjustable pump, causes a fluid for temperature adjustment to be circulated between a heat exchanger that transfers heat supplied from a refrigerant to the fluid, and an object to be adjusted for temperature that uses the heat of the fluid, the temperature-adjusting fluid supply apparatus being able to appropriately control a pump and prevent the fluid from freezing in the pipes even when the fluid temperature is decreased.

Solution to Problem

A temperature-adjusting fluid supply apparatus according to a first aspect has a heat exchanger, a supply tube, a return tube, a pump, a first flow rate detection means, a second flow rate detection means, a temperature detection means, and a control part. The heat exchanger transfers heat supplied from a refrigerant to a fluid for temperature adjustment. The fluid flows through the supply tube from the heat exchanger toward an object to be adjusted for temperature. The fluid returning from the object to be adjusted for temperature flows through the return tube. The pump is arranged in the supply tube or the return tube. The pump is flow rate adjustable. The first flow rate detection means is arranged in the supply tube or the return tube. The first flow rate detection means detects the flow rate of the fluid. The second flow rate detection means is arranged in the supply tube or the return tube. The second flow rate detection means detects the flow rate of the fluid. The second flow rate detection means is capable of detecting flow rate changes with a precision coarser than the first flow rate detection means, and is less affected in detection accuracy by viscosity changes in the fluid than the first flow rate detection means is affected. The temperature detection means detects the temperature of the fluid. The control part switches, on the basis of the temperature of the fluid detected by the temperature detection means, between control of the pump based on the detection results of the first flow rate detection means and control of the pump based on the detection results of the second flow rate detection means.

In the temperature-adjusting fluid supply apparatus according to the first aspect, control of the pump is switched, on the basis of the temperature of the fluid, to control based on the detection results of the second flow rate detection means, which experiences comparatively little effect on detection accuracy by viscosity changes. Therefore, the pump can be appropriately controlled to prevent the fluid from freezing in the pipes even when the fluid temperature has decreased. Additionally, in the temperature-adjusting fluid supply apparatus according to the first aspect, control of the pump is switched, on the basis of the temperature of the fluid, to control based on the detection results of the first flow rate detection means, which is capable of detecting comparatively minute flow rate changes. Therefore, when the temperature of the fluid is comparatively high and the viscosity is comparatively low, the flow rate of the fluid can be finely controlled and the apparatus can be operated efficiently.

A temperature-adjusting fluid supply apparatus according to a second aspect is the temperature-adjusting fluid supply apparatus according to the first aspect, wherein the first flow rate detection means and the second flow rate detection means are arranged in the supply tube.

In the temperature-adjusting fluid supply apparatus according to the second aspect, because the first flow rate detection means and the second flow rate detection means are arranged in the supply tube, in which the temperature of the fluid is comparatively high, the fluid is unlikely to have high viscosity at the flow rate detection positions. Therefore, the effect of the fluid viscosity on flow rate detection can be more suppressed than in cases in which the first flow rate detection means and the second flow rate detection means are arranged in the return tube.

A temperature-adjusting fluid supply apparatus according to a third aspect is the temperature-adjusting fluid supply apparatus according to the second aspect, wherein the temperature detection means detects the temperature of the fluid flowing through the supply tube.

In the temperature-adjusting fluid supply apparatus according to the third aspect, the temperature detection means detects the temperature of the fluid flowing through the supply tube, in which the first flow rate detection means and the second flow rate detection means are arranged. Therefore, it is easy to appropriately switch between control of the pump based on the detection results of the first flow rate detection means and control of the pump based on the detection results of the second flow rate detection means.

A temperature-adjusting fluid supply apparatus according to a fourth aspect is the temperature-adjusting fluid supply apparatus according to any one of the first through third aspects, wherein the first flow rate detection means outputs the detection results of the flow rate of the fluid in an analog format. The second flow rate detection means outputs the detection results of the flow rate of the fluid in a binary format.

In this aspect, the flow rate of the fluid can be detected with better precision with the first flow rate detection means, and it is possible even with the second flow rate detection means to detect whether or not the flow rate is equal to or greater than a predetermined rate.

A temperature-adjusting fluid supply apparatus according to a fifth aspect is the temperature-adjusting fluid supply apparatus according to any one of the first through fourth aspects, wherein the temperature-adjusting fluid supply apparatus is installed outdoors.

In the temperature-adjusting fluid supply apparatus according to the fifth aspect, the temperature of the fluid is likely to be low when the outside air temperature is low. However, because the control of the pump based on the detection results of the first flow rate detection means and the control of the pump based on the detection results of the second flow rate detection means are switched therebetween on the basis of the temperature of the fluid, the pump can be appropriately controlled to prevent the fluid from freezing in the pipes.

Advantageous Effects of Invention

In the temperature-adjusting fluid supply apparatus according to the first aspect, control of the pump is switched, on the basis of the temperature of the fluid, to control based on the detection results of the second flow rate detection means, which experiences comparatively little effect on detection accuracy by viscosity changes. Therefore, the pump can be appropriately controlled to prevent the fluid from freezing in the pipes even when the fluid temperature has decreased. Additionally, in the temperature-adjusting fluid supply apparatus according to the first aspect, the control of the pump is switched, on the basis of the temperature of the fluid, to the control based on the detection results of the first flow rate detection means, which is capable of detecting comparatively minute flow rate changes. Therefore, when the temperature of the fluid is comparatively high and the viscosity is comparatively low, the flow rate of the fluid can be finely controlled and the apparatus can be operated efficiently.

In the temperature-adjusting fluid supply apparatus according to the second aspect, the effect of the fluid viscosity on flow rate detection can be suppressed.

In the temperature-adjusting fluid supply apparatus according to the third aspect, it is easy to appropriately switch between the control of the pump based on the detection results of the first flow rate detection means and the control of the pump based on the detection results of the second flow rate detection means.

In the temperature-adjusting fluid supply apparatus according to the fourth aspect, the flow rate of the fluid can be detected with better precision with the first flow rate detection means, and it is possible even with the second flow rate detection means to detect whether or not the flow rate is equal to or greater than a predetermined rate.

In the temperature-adjusting fluid supply apparatus according to the fifth aspect, the temperature of the fluid is likely to be low when the outside air temperature is low. However, because the control of the pump based on the detection results of the first flow rate detection means and the control of the pump based on the detection results of the second flow rate detection means are switched therebetween on the basis of the temperature of the fluid, the pump can be appropriately controlled to prevent the fluid from freezing in the pipes.

DESCRIPTION OF EMBODIMENTS

A temperature-adjusting fluid supply apparatus 100 according to one embodiment of the present invention is described below with reference to the drawings. The following embodiment is merely a specific example of a temperature-adjusting fluid supply apparatus according to one embodiment of the present invention and may be modified within a range that does not deviate from the scope of the invention.

(1) Overall Configuration

Figure 1:
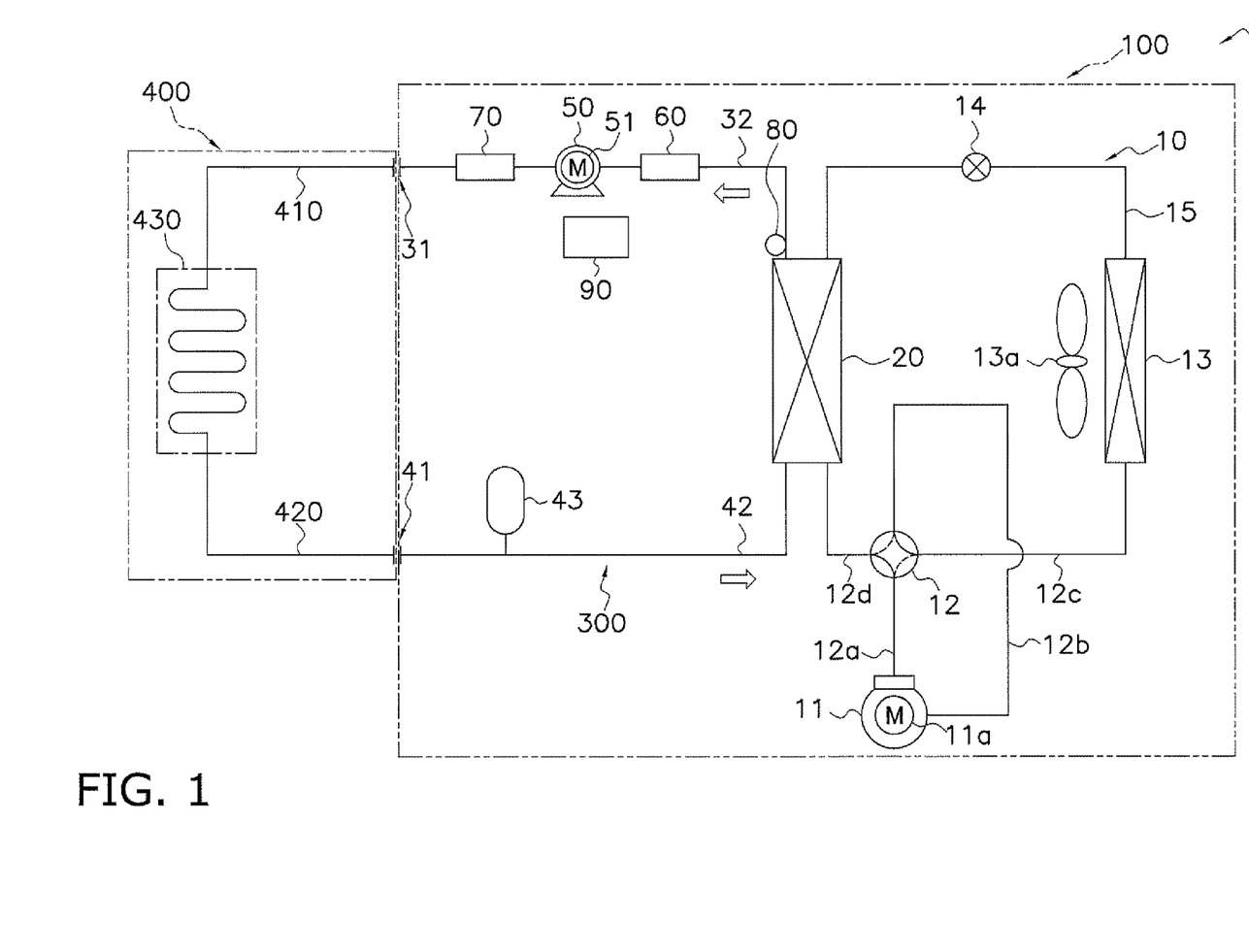
FIG. 1 is a schematic configuration diagram of an air-conditioning system including a temperature-adjusting fluid supply apparatus according to an embodiment of the present invention.

FIG. 1 is a schematic configuration diagram of an air-conditioning system 1 including the temperature-adjusting fluid supply apparatus 100 according to an embodiment of the present invention.

The air-conditioning system 1 is able to perform an operation to heat/cool a temperature-adjusting fluid, using a vapor-compression heat pump cycle. The temperature-adjusting fluid in the present embodiment is a fluid for air-conditioning. Heating/cooling of a space to be air-conditioned is performed in the air-conditioning system 1 using heat of the temperature-adjusting fluid which is heated/cooled by a refrigerant.

The air-conditioning system 1 includes the temperature-adjusting fluid supply apparatus 100 and an air conditioner unit 400.

(2) Detailed Configuration

The temperature-adjusting fluid supply apparatus 100 and the air conditioner unit 400 are described in detail below.

(2-1) Temperature-Adjusting Fluid Supply Apparatus

The temperature-adjusting fluid supply apparatus 100 supplies the temperature-adjusting fluid (fluid for adjusting temperature), heated/cooled by the refrigerant, to an air conditioner 430 of the air conditioner unit 400, which is the object to be adjusted for temperature.

The temperature-adjusting fluid supply apparatus 100 is installed outdoors.

The temperature-adjusting fluid supply apparatus 100 is provided mainly with a compressor 11, a switching mechanism 12, a heat-source-side heat exchanger 13, an expansion valve 14, a usage-side heat exchanger 20, a fluid supply part 31, a supply tube 32, a fluid return part 41, a return tube 42, a pump 50, a flow sensor 60, a flow switch 70, a temperature sensor 80, and a control part 90.

The compressor 11, the switching mechanism 12, the heat-source-side heat exchanger 13, the expansion valve 14, and the usage-side heat exchanger 20 are connected by pipes (a discharge tube 12a, an intake tube 12b, a first gas refrigerant tube 12c, a second gas refrigerant tube 12d, and a liquid refrigerant tube 15, described hereinafter), and constitute a refrigerant circuit 10 through which the refrigerant circulates. For example, R-410A or another HFC-based refrigerant is filled in the refrigerant circuit 10. The type of refrigerant is given here by way of example, and not by way of limitation.

The usage-side heat exchanger 20 and the object to be adjusted for temperature (the air conditioner 430 of the air conditioner unit 400 described hereinafter) are connected by pipes including the supply tube 32 and the return tube 42, and constitute a fluid circuit 300 through which the temperature-adjusting fluid circulates. For example, an ethylene glycol aqueous solution or another type of brine is filled, as the temperature-adjusting fluid, in the fluid circuit 300. The type of temperature-adjusting fluid is given here by way of example, and not by way of limitation. The temperature-adjusting fluid has the property of increasing in viscosity as the temperature decreases.

In the usage-side heat exchanger 20, heat is transferred from the refrigerant flowing through the refrigerant circuit 10 to the temperature-adjusting fluid flowing through the fluid circuit 300. In the air conditioner 430 of the air conditioner unit 400 described hereinafter, the space to be air-conditioned, in which the air conditioner 430 is present, is heated or cooled with the heat of the temperature-adjusting fluid supplied by the temperature-adjusting fluid supply apparatus 100.

The components of the temperature-adjusting fluid supply apparatus 100 are described below.

(2-1-1) Compressor

The compressor 11 is a mechanism for compressing refrigerant. The compressor 11 in this embodiment is a hermetic compressor in which a rotary, scroll, or other type of positive-displacement compression element (not shown), accommodated in a casing (not shown), is driven by a compressor motor 11a also accommodated in the casing. The rotational speed (i.e., the operating frequency) of the compressor motor 11a can be varied by an inverter, whereby the capacity of the compressor 11 can be varied.

(2-1-2) Switching Mechanism

The switching mechanism 12 is configured to be capable of switching between a heat-source-side heat-radiating operation state in which the heat-source-side heat exchanger 13 is made to function as a radiator of refrigerant, and a heat-source-side evaporating operation state in which the heat-source-side heat exchanger 13 is made to function as an evaporator of refrigerant. The switching mechanism 12 is a four-way switching valve in this embodiment.

The switching mechanism 12 is connected to the discharge tube 12a through which refrigerant discharged from the compressor 11 flows, the intake tube 12b through which refrigerant drawn into the compressor 11 flows, the first gas refrigerant tube 12c which is connected at one end to the gas side of the heat-source-side heat exchanger 13, and the second gas refrigerant tube 12d which is connected at one end to the gas side of the usage-side heat exchanger 20.

The switching mechanism 12 can switch a communication so that the discharge tube 12a and the first gas refrigerant tube 12c are communicated with each other, and the second gas refrigerant tube 12d and the intake tube 12b are communicated with each other (corresponding to the heat-source-side heat-radiating operation state, refer to the dashed lines of the switching mechanism 12 in FIG. 1). The switching mechanism 12 can also switch a communication so that the discharge tube 12a and the second gas refrigerant tube 12d are communicated with each other, and the first gas refrigerant tube 12c and the intake tube 12b are communicated with each other (corresponding to the heat-source-side evaporating operation state, refer to the solid lines of the switching mechanism 12 in FIG. 1).

The switching mechanism 12 is not limited to a four-way switching valve. For example, the switching mechanism 12 may be configured by combining a plurality of electromagnetic valves, so as to have the function of switching the refrigerant flow direction in the same manner as described above.

(2-1-3) Heat-Source-Side Heat Exchanger

The heat-source-side heat exchanger 13 functions as a radiator or evaporator of refrigerant by exchanging heat between the refrigerant and outdoor air. The liquid refrigerant tube 15, which is connected at one end to the liquid side of the usage-side heat exchanger 20. is connected to the liquid side of the heat-source-side heat exchanger 13. The first gas refrigerant tube 12c, which is connected at one end to the switching mechanism 12, is connected to the gas side of the heat-source-side heat exchanger 13. Outdoor air, which exchanges heat with the refrigerant, is supplied by a fan 13a to the heat-source-side heat exchanger 13.

(2-1-4) Expansion Valve

The expansion valve 14 is an electric expansion valve of a variable opening and depressurizes refrigerant flowing through the liquid refrigerant tube 15. The expansion valve 14 is arranged in the liquid refrigerant tube 15.

(2-1-5) Usage-Side Heat Exchanger

The usage-side heat exchanger 20 functions as an evaporator or a radiator of refrigerant by exchanging heat between the refrigerant flowing through the refrigerant circuit 10 and the temperature-adjusting fluid flowing through the fluid circuit 300. The usage-side heat exchanger 20 is a heat exchanger which transfers, to the temperature-adjusting fluid, the heat (warming heat/cooling heat) supplied from the refrigerant flowing through the refrigerant circuit 10.

The liquid refrigerant tube 15, which is connected at one end to the liquid side of the heat-source-side heat exchanger 13, is connected to the liquid side of the flow channel of the usage-side heat exchanger 20 through which the refrigerant flows. The second gas refrigerant tube 12d, which is connected at one end to the switching mechanism 12, is connected to the gas side of the flow channel of the usage-side heat exchanger 20 through which the refrigerant flows. The return tube 42 is connected to the inlet side of the flow channel of the usage-side heat exchanger 20 through which the temperature-adjusting fluid flows. The supply tube 32 is connected to the outlet side of the flow channel of the usage-side heat exchanger 20 through which the temperature-adjusting fluid flows.

(2-1-6) Fluid Supply Part

The fluid supply part 31 is a part for connecting pipes. A forward external pipe 410 of the air conditioner unit 400, through which the temperature-adjusting fluid heading to the air conditioner 430 of the air conditioner unit 400 flows, is connected to the fluid supply part 31. The forward external pipe 410 of the air conditioner unit 400 will be described later. The fluid supply part 31 is a flange-type connecting part, but is not limited thereto. The fluid supply part 31 may be, a screw-type connecting part or the like.

In the present embodiment, the forward external pipe 410 and the supply tube 32 are removably connected in the fluid supply part 31, but this arrangement is not provided by way of limitation. For example, the temperature-adjusting fluid supply apparatus 100 may not have a fluid supply part 31 in which the forward external pipe 410 and the supply tube 32 are removably connected. For example, the forward external pipe 410 and the supply tube 32 may be directly connected by welding. In another embodiment, the forward external pipe 410 may be omitted and the supply tube 32 may be directly connected to the air conditioner 430 of the air conditioner unit 400.

(2-1-7) Supply Tube

The supply tube 32 is a pipe that connects the usage-side heat exchanger 20 and the fluid supply part 31. The temperature-adjusting fluid heading from the usage-side heat exchanger 20 to the air conditioner 430 of the air conditioner unit 400, which is the object to be adjusted for temperature, flows in the supply tube 32. The temperature-adjusting fluid, to which heat is supplied from the refrigerant in the usage-side heat exchanger 20, flows in the supply tube 32, toward the fluid supply part 31 (refer to the arrow in FIG. 1).

(2-1-8) Fluid Return Part

The fluid return part 41 is a connecting part for pipes. A return external pipe 420 of the air conditioner unit 400, through which the temperature-adjusting fluid returning from the air conditioner 430 of the air conditioner unit 400 flows, is connected to the fluid return part 41. The return external pipe 420 of the air conditioner unit 400 will be described later. The fluid return part 41 is a flange-type connecting part, but is not limited thereto. The fluid return part 41 may be, e.g., a screw-type connecting part or the like.

In the present embodiment, the return external pipe 420 and the return tube 42 are removably connected in the fluid return part 41, but this arrangement is not provided by way of limitation. For example, the temperature-adjusting fluid supply apparatus 100 may not have a fluid return part 41 in which the return external pipe 420 and the return tube 42 are removably connected. For example, the return external pipe 420 and the return tube 42 may be directly connected by welding. In another embodiment, the return external pipe 420 may be omitted and the return tube 42 may be directly connected to the air conditioner 430 of the air conditioner unit 400.

(2-1-9) Return Tube

The return tube 42 is a pipe that connects the usage-side heat exchanger 20 and the fluid return part 41. The temperature-adjusting fluid returning from the air conditioner 430 of the air conditioner unit 400, which is the object to be adjusted for temperature, flows in the return tube 42. The temperature-adjusting fluid that has been used by the air conditioner 430 of the air conditioner unit 400 for heating/cooling the space to be air-conditioned flows in the return tube 42. toward the fluid return part 41 (refer to the arrow in FIG. 1).

The return tube 42 is provided with an expansion tank 43 where the temperature-adjusting fluid is accommodated when the temperature-adjusting fluid in the fluid circuit 300 has risen in temperature and expanded. The expansion tank 43 is an sealed tank.

(2-1-10) Pump

The pump 50 is a pump to boost the pressure of the temperature-adjusting fluid and cause the temperature-adjusting fluid to circulate in the fluid circuit 300. In the pump 50, a centrifugal or positive-displacement pump element (not shown) is driven by a pump motor 51. The pump 50 is arranged in the supply tube 32 in this embodiment. This arrangement is not provided by way of limitation. The pump 50 may be provided on the return tube 42. The pump motor 51 is configured so that the rotational speed thereof (i.e., the operating frequency) can be varied by an inverter, whereby the capacity of the pump 50 can be varied.

(2-1-11) Flow Sensor

The flow sensor 60 is an example of the first flow rate detection means. The flow sensor 60 detects the flow rate of the temperature-adjusting fluid. The flow sensor 60 is arranged in the supply tube 32. More specifically, the flow sensor 60 is arranged upstream of the pump 50 (between the usage-side heat exchanger 20 and the pump 50) in the supply tube 32.

For example, the flow sensor 60 is a vortex flowmeter that determines flow rate by measuring the number of Kármán vortices generated downstream of a vortex shedder disposed in the flow.

The flow sensor 60 outputs the detection result for the flow rate of the temperature-adjusting fluid in an analog format. In other words, the flow sensor 60 detects the flow rate of the temperature-adjusting fluid as continuous numerical values and outputs the results of this detection. That is, the flow sensor 60 detects the flow rate of the temperature-adjusting fluid in multiple levels and outputs the results of this detection.

The detection results of the flow sensor 60 are outputted to the control part 90, described hereinafter. The signal outputted from the flow sensor 60 is not limited to an analog signal. For example, the flow sensor 60 may output a pulse signal, and the control part 90 may be configured so as to receive a pulse signal converted to analog output by a converter.

With a flow sensor 60 such as a vortex flowmeter, detection accuracy is likely to decrease when the viscosity of the temperature-adjusting fluid increases. As a specific example, with a flow sensor 60 such as a vortex flowmeter, when the viscosity of the temperature-adjusting fluid increases, the value of a lower-limit flow rate at which detection accuracy can be guaranteed becomes greater. Therefore, with the flow sensor 60, when the temperature of the temperature-adjusting fluid decreases and viscosity increases (particularly, when the flow rate is low), there is a possibility of the flow rate being undetectable or of an erroneous flow rate being detected.

(2-1-12) Flow Switch

The flow switch 70 is an example of a second flow rate detection means. The flow switch 70 detects the flow rate of the temperature-adjusting fluid. The flow switch 70 is arranged in the supply tube 32. More specifically, the flow switch 70 is arranged downstream of the pump 50 (between the pump 50 and the fluid supply part 31) in the supply tube 32.

In this embodiment, the flow switch 70 is configured as follows.

A paddle (not shown) is installed in the flow channel in the flow switch 70 through which the temperature-adjusting fluid flows. In the flow switch 70, when the temperature-adjusting fluid flows through the flow channel in the flow switch 70 at or above a predetermined rate Fsw, the paddle is pushed by the temperature-adjusting fluid and a detection switch is activated, and the flow rate of the temperature-adjusting fluid is detected.

Because of such a configuration, the flow switch 70 outputs the detection results of the flow rate of the temperature-adjusting fluid in a binary format. In other words, the flow switch 70 detects the flow rate of the temperature-adjusting fluid in two levels (whether or not the flow rate is equal to or greater than the predetermined rate Fsw), and outputs these detection results. Therefore, the flow rate change that can be detected by the flow switch 70 is coarser than the flow rate change that can be detected by the flow sensor 60, which detects the flow rate in multiple levels. The detection results of the flow switch 70 are outputted to the control part 90, described hereinafter.

With the flow switch 70 configured as described above, the viscosity change of the temperature-adjusting fluid is not likely to affect the detection accuracy. Therefore, even when the temperature-adjusting fluid decreases in temperature and increases in viscosity and it is difficult for the flow rate to be detected by the flow sensor 60, the flow rate can be correctly detected by the flow switch 70 (it is possible to detect whether or not the temperature-adjusting fluid is flowing at or above the predetermined rate Fsw).

(2-1-13) Temperature Sensor

The temperature sensor 80 is an example of the temperature detection means to detect the temperature of the temperature-adjusting fluid. The temperature sensor 80 is arranged in the supply tube 32. More specifically, the temperature sensor 80 is installed upstream of the flow sensor 60 (between the usage-side heat exchanger 20 and the flow sensor 60) in the supply tube 32. The temperature sensor 80 detects the temperature of the temperature-adjusting fluid flowing through the supply tube 32.

The temperature sensor 80 is, e.g., a thermistor, but is not limited to a thermistor and various sensors can be used.

The detection results of the temperature sensor 80 are outputted to the control part 90, described hereinafter.

(2-1-14) Controller

The control part 90 has a microcomputer, a memory, and/or the like (not shown) as primary components.

The control part 90 is electrically connected with components such as, e.g., the compressor motor 11a, the motor (not shown) of the fan 13a, the expansion valve 14, and the pump motor 51. The control part 90 is designed so as to communicate control signals etc. with a remote controller (not shown) operated by a user of the air conditioner 430.

Additionally, the control part 90 is electrically connected with sensors (not shown) arranged at various parts of the refrigerant circuit 10, and the control part 90 acquires detection results (temperature, pressure, etc.) that pertain to the state of the refrigerant and that are transmitted from the sensors. Additionally, the control part 90 is electrically connected with the flow sensor 60, the flow switch 70, and the temperature sensor 80, and the control part 90 receives detection results of the flow rate and temperature of the temperature-adjusting fluid and that are transmitted from the flow sensor 60, the flow switch 70, and the temperature sensor 80. Furthermore, the control part 90 is electrically connected with other sensors (not shown) arranged at various parts of the fluid circuit 300, and the control part 90 acquires detection results (temperature etc.) that pertain to the state of the temperature-adjusting fluid and that are transmitted from the sensors.

Due to the microcomputer executing programs stored in the memory, the control part 90 controls the operations of the components of the temperature-adjusting fluid supply apparatus 100 on the basis of, for example, control signals received from the remote controller and/or detection results of the sensors.

As is described hereinafter, on the basis of the temperature of the temperature-adjusting fluid detected by the temperature sensor 80, the control part 90 switches between the control of the pump 50 based on the detection results of the flow sensor 60 and the control of the pump 50 based on the detection results of the flow switch 70.

(2-2) Air Conditioner Unit

The air conditioner unit 400 has the air conditioner 430 installed in the indoor space to be air-conditioned, the forward external pipe 410, and the return external pipe 420.

In FIG. 1, the number of the air conditioner 430 is one, but no limitation is provided thereby. The air conditioners 430 may be plural. When a plurality of air conditioners 430 are provided, the air conditioner unit 400 may be provided with valves or the like for individually switching between supplying and not supplying the temperature-adjusting fluid to the air conditioners 430.

(2-2-1) Forward External Pipe

The forward external pipe 410 connects the air conditioner 430 and the fluid supply part 31. The forward external pipe 410 is connected with the supply tube 32 in the fluid supply part 31. In the forward external pipe 410, the temperature-adjusting fluid flows from the fluid supply part 31, or in other words from the supply tube 32, toward the air conditioner 430. The forward external pipe 410, which connects the air conditioner 430 installed indoors and the temperature-adjusting fluid supply apparatus 100 installed outdoors, may be partially installed outdoors.

(2-2-2) Return External Pipe

The return external pipe 420 connects the air conditioner 430 and the fluid return part 41. The return external pipe 420 is connected with the return tube 42 in the fluid return part 41. In the return external pipe 420, the temperature-adjusting fluid flows from the air conditioner 430 toward the fluid return part 41, or in other words from the air conditioner 430 toward the return tube 42. The return external pipe 420, which connects the air conditioner 430 installed indoors and the temperature-adjusting fluid supply apparatus 100 installed outdoors, may be partially installed outdoors.

(2-2-3) Air Conditioner

The air conditioner 430 is a heat exchanger that functions as a radiator of the temperature-adjusting fluid circulating through the fluid circuit 300. The air conditioner 430 is one example of the object to be adjusted for temperature. The forward external pipe 410 is connected to an inlet for the temperature-adjusting fluid in the air conditioner 430. The return external pipe 420 is connected to an outlet for the temperature-adjusting fluid in the air conditioner 430.

The air conditioner 430 is, specifically, a radiator, a floor cooling/heating panel, and/or the like.

For example, when the air conditioner 430 is a radiator, the air conditioner 430 is arranged alongside a wall or the like in a room. For example, when the air conditioner 430 is a floor cooling/heating panel, the air conditioner 430 is provided underneath the floor or the like in a room.

(3) Operation of the Temperature-Adjusting Fluid Supply Apparatus During Heating by the Air Conditioner The operation of the temperature-adjusting fluid supply apparatus 100 during heating by the air conditioner 430 will be described.

During heating by the air conditioner 430, the switching mechanism 12 is switched to the heat-source-side evaporating operation state (the state shown by the solid lines in the switching mechanism 12 in FIG. 1) in the refrigerant circuit 10.

In the refrigerant circuit 10 in this state, refrigerant at a low pressure in the refrigeration cycle is drawn into the compressor 11 through the intake tube 12*b*, compressed to a high pressure in the refrigeration cycle in the compressor 11, and discharged to the discharge tube 12*a*. The control part 90 performs capacity control of the compressor 11 (control of the rotational speed of the compressor motor 11*a*) on the basis of detection results pertaining to the state of the refrigerant as found by various sensors (not shown) arrange in the refrigerant circuit 10. The high-pressure refrigerant discharged to the discharge tube 12*a* is sent to the usage-side heat exchanger 20 through the switching mechanism 12 and the second gas refrigerant tube 12*d*. The high-pressure refrigerant sent to the usage-side heat exchanger 20 exchanges heat in the usage-side heat exchanger 20 with the temperature-adjusting fluid circulating through the fluid circuit 300 with the pump 50, and supplies (radiates) heat to the temperature-adjusting fluid. The refrigerant, that has supplied heat to the temperature-adjusting fluid in the usage-side heat exchanger 20, flows through the liquid refrigerant tube 15, is depressurized in the expansion valve 14 to become a low-pressure, gas-liquid, two-phase state, and is sent to the heat-source-side heat exchanger 13. The opening degree of the expansion valve 14 is controlled by the control part 90 on the basis of the detection results pertaining to the state of the refrigerant as found by the various sensors (not shown) arranged in the refrigerant circuit 10. The low-pressure refrigerant sent to the heat-source-side heat exchanger 13 exchanges heat with the outdoor air supplied by the fan 13*a*, and evaporates in the heat-source-side heat exchanger 13. The low-pressure refrigerant evaporated in the heat-source-side heat exchanger 13 is drawn, through the first gas refrigerant tube 12*c*, the switching mechanism 12, and the intake tube 12*b*, back into the compressor 11.

In the fluid circuit 300. the temperature-adjusting, fluid circulating through the fluid circuit 300 is heated by the heat radiation of the refrigerant in the usage-side heat exchanger 20. The temperature-adjusting fluid heated in the usage-side heat exchanger 20 flows into the supply tube 32, the fluid is drawn into the pump 50 and boosted in pressure, and the fluid is sent from the fluid supply part 31 to the forward external pipe 410. The control part 90 performs capacity control of the pump 50 (control of the rotational speed of the pump motor 51) according to, inter alia, detection results pertaining to the state of the temperature-adjusting fluid as found by the various sensors arranged in the fluid circuit 300. The temperature-adjusting fluid heated in the usage-side heat exchanger 20 and flowing through the supply tube 32 passes through the forward external pipe 410 and heads toward the air conditioner 430. The temperature-adjusting fluid sent to the air conditioner 430 radiates heat in the air conditioner 430, thereby heating the walls and/or floor etc. in the room. The temperature-adjusting fluid, which have passed through the pipes in the air conditioner 430, is sent through the return external pipe 420 to the fluid return part 41, and the fluid flows through the return tube 42 and returns to the usage-side heat exchanger 20.

The temperature-adjusting fluid supply apparatus 100 is installed outdoors. Parts of the forward external pipe 410 and the return external pipe 420 of the air conditioner unit 400 may be installed outdoors. Therefore, when the outside air temperature is low and thereby heating is performed by the air conditioner 430, there is a risk of the temperature-adjusting fluid freezing inside the pipes if the temperature-adjusting fluid does not circulate through the pipes.

In view of this, during heating by the air conditioner 430, the control part 90 performs the capacity control of the pump 50 on the basis of the detection results of the flow rate of the temperature-adjusting fluid, regardless of the air-conditioning load and the like, so that the temperature-adjusting fluid flows in the fluid circuit 300 at least at a minimum allowable flow rate Fmin.

The flow rate of the temperature-adjusting fluid is preferably detected by the flow sensor 60, which is capable of detecting minute changes in flow rate (capable of detecting the flow rate of the temperature-adjusting fluid in continuous numerical values). However, when the temperature of the temperature-adjusting fluid decreases and viscosity increases, the flow rate detection by the flow sensor 60 becomes difficult as described above. Therefore, the control part 90 performs the capacity control of the pump 50, for example, as is indicated below (refer to the flowchart shown in FIG. 2).

Figure 2:
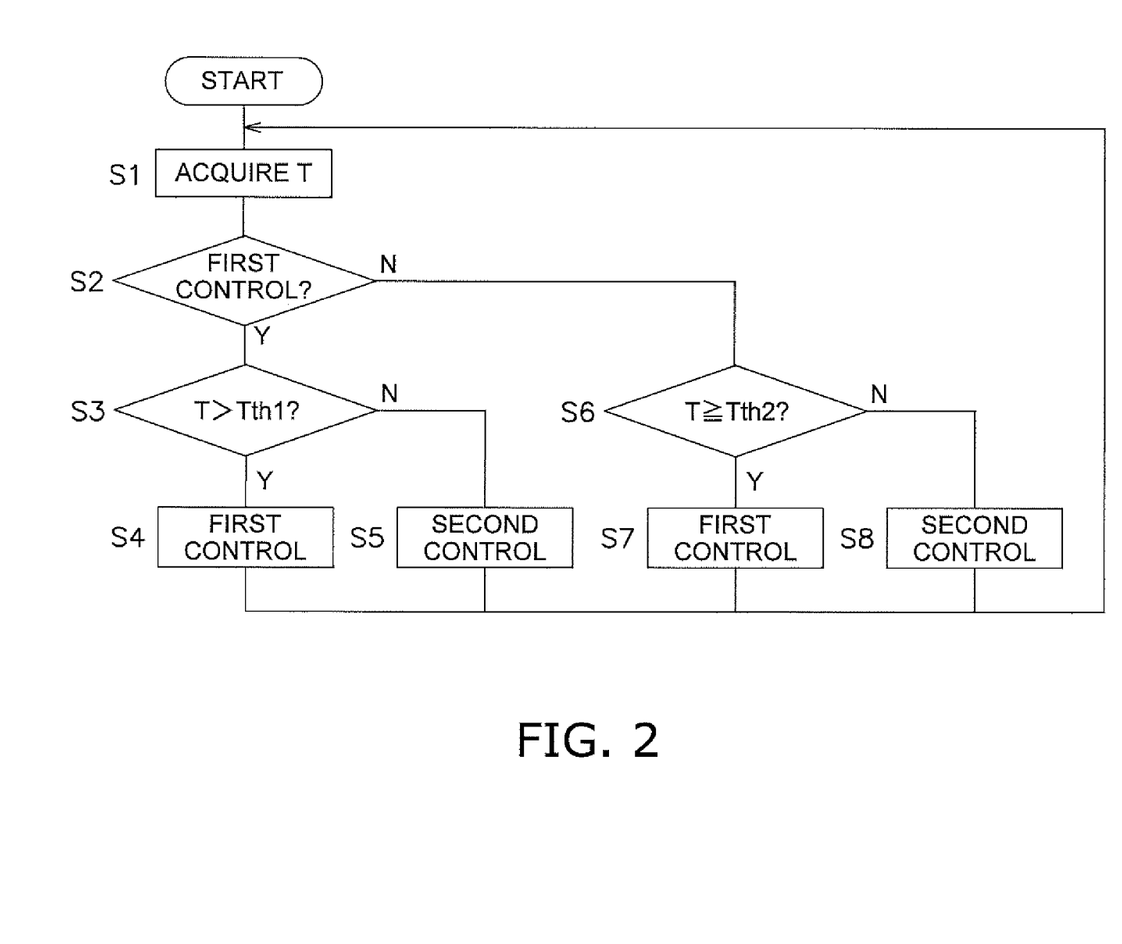
FIG. 2 is a flowchart relating to minimum flow rate control of a pump of the temperature-adjusting fluid supply apparatus according to FIG. 1.

The control part 90 acquires the temperature T of the temperature-adjusting fluid from the temperature sensor 80 (step S1). For example, the control part 90 periodically acquires the temperature T of the temperature-adjusting fluid detected by the temperature sensor 80.

Next, in step S2, the control part 90 judges whether or not the control of the pump 50 currently being performed is a first control described hereinafter. When the first control is performed, the process advances to step S3, and when the first control is not performed (when a second control described hereinafter is performed), the process advances to step S6. For example, the control part 90 is set to perform the first control when the temperature-adjusting fluid supply apparatus 100 starts up.

In step S3, the control part 90 judges whether or not the temperature T of the temperature-adjusting fluid is higher than a predetermined threshold Tth1. The predetermined threshold Tth1 is a temperature as follows. The temperature-adjusting fluid flowing in the fluid circuit 300 at the minimum allowable flow rate Fmin can be accurately detected by the flow sensor 60, when the temperature T of the temperature-adjusting fluid is higher than the threshold Tth1. The predetermined threshold Tth1 is stored in advance in the memory of the control part 90.

When it is determined in step S3 that the temperature T of the temperature-adjusting fluid is higher than the threshold Tth1, the control part 90 continues the first control (step S4). The first control is control of the pump 50 based on the detection results of the flow sensor 60. Specifically, in the first control, the control part 90 performs the capacity control of the pump 50 according to, inter cilia, the detection results pertaining to the state of the temperature-adjusting fluid as found by the sensors arranged in the fluid circuit 300, and performs the capacity control of the pump 50 so that the flow rate of the temperature-adjusting fluid detected by the flow sensor 60 does not fall below the minimum allowable flow rate Fmin.

When the temperature T of the temperature-adjusting fluid is determined in step S3 to be equal to or less than the threshold Tth1, the control part 90 switches the first control to the second control (step S5). The second control is control of the pump 50 based on the detection results of the flow switch 70. Specifically, in the second control, the control part 90 performs the capacity control of the pump 50 according to, inter cilia, the detection results pertaining to the state of the temperature-adjusting fluid as found by the sensors arranged in the fluid circuit 300, and performs the capacity control of the pump 50 so that the flow rate of the temperature-adjusting fluid detected by the flow switch 70 does not fall below the minimum allowable flow rate Fmin. Specifically, the control part 90 performs the capacity control of the pump 50 so that the flow rate of the temperature-adjusting fluid does not fall below a predetermined rate Fsw at which the flow switch 70 activates (at which the flow switch 70 determines that the temperature-adjusting fluid is flowing). The flow switch 70 is designed so that the predetermined rate Fsw at which the flow switch 70 activates is equal to or greater than the minimum allowable flow rate Fmin.

In step S6, the control part 90 determines whether or not the temperature T of the temperature-adjusting fluid is equal to or greater than a predetermined threshold Tth2. The predetermined threshold Tth2 is a temperature equal to or greater than the threshold Tth (normally greater than the threshold Tth2). The predetermined threshold Tth2 is stored in advance in the control part 90.

When the temperature T of the temperature-adjusting fluid is determined in step S6 to be equal to or greater than the threshold Tth2, the control part 90 switches the second control to the first control (step S7).

When the temperature T of the temperature-adjusting fluid is determined in step S6 to be lower than the threshold Tth2, the control part 90 continues the second control (step S8).

After steps S4, S5, S7, and S8 have ended, the process returns to step S1, and the process described above is performed repeatedly.

(4) Characteristics (4-1)

The temperature-adjusting fluid supply apparatus 100 is provided with the usage-side heat exchanger 20 serving as an example of a heat exchanger, the supply tube 32, the return tube 42, the pump 50, the flow sensor 60 serving as an example of the first flow rate detection means, the flow switch 70 serving as an example of the second flow rate detection means, the temperature sensor 80 serving as an example of the temperature detection means, and the control part 90. The usage-side heat exchanger 20 transfers the heat supplied from the refrigerant to the temperature-adjusting fluid. The temperature-adjusting fluid flows through the supply tube 32 from the usage-side heat exchanger 20 toward the air conditioner 430 of the air conditioner unit 400. which is the object to be adjusted for temperature. The temperature-adjusting fluid returning from the air conditioner 430 flows through the return tube 42. The pump 50 is arranged in the supply tube 32. The pump 50 is flow rate adjustable. The flow sensor 60 is arranged in the supply tube 32. The flow sensor 60 detects the flow rate of the temperature-adjusting fluid. The flow switch 70 is arranged in the supply tube 32. The flow switch 70 detects the flow rate of the temperature-adjusting fluid. The flow switch 70 is capable of detecting flow rate changes with a precision coarser than the flow sensor 60 and is less affected in the detection accuracy by viscosity changes in the temperature-adjusting fluid than the detection accuracy of the flow sensor 60 is affected. The temperature sensor 80 detects the temperature of the temperature-adjusting fluid. On the basis of the temperature of the temperature-adjusting fluid detected by the temperature sensor 80, the control part 90 switches between the control of the pump 50 based on the detection results of the flow sensor 60 and the control of the pump 50 based on the detection results of the flow switch 70.

In this embodiment, the control of the pump 50 is switched, on the basis of the temperature of the temperature-adjusting fluid, to the control based on the detection results of the flow switch 70, which experiences comparatively little effect on the detection accuracy by viscosity change. Therefore, the pump 50 can be appropriately controlled to prevent the temperature-adjusting fluid from freezing in the pipes even when the fluid temperature has decreased. Additionally, in this embodiment, the control of the pump 50 is switched, on the basis of the temperature of the temperature-adjusting fluid, to the control based on the detection results of the flow sensor 60, which is capable of detecting comparatively minute flow rate changes. Therefore, the flow rate of the temperature-adjusting fluid can be finely controlled and the apparatus can be operated efficiently when the temperature of the temperature-adjusting fluid is comparatively high and the viscosity is comparatively low.

(4-2)

In the temperature-adjusting fluid supply apparatus 100, the flow sensor 60 and the flow switch 70 are arranged in the supply tube 32.

Because the flow sensor 60 and the flow switch 70 are arranged in the supply tube 32, in which the temperature of the temperature-adjusting fluid is comparatively high, the fluid is not likely to be highly viscous at the flow rate detection positions. Therefore, the effect that the viscosity of the temperature-adjusting fluid has on flow rate detection can be suppressed more than in cases in which the flow sensor 60 and the flow switch 70 are arranged in the return tube 42.

(4-3)

In the temperature-adjusting fluid supply apparatus 100, the temperature sensor 80 detects the temperature of the temperature-adjusting fluid flowing through the supply tube 32.

The temperature sensor 80 detects the temperature of the temperature-adjusting fluid flowing through the supply tube 32 in which the flow sensor 60 and the flow switch 70 are arranged. Therefore, it is easy to appropriately switch between the control of the pump 50 based on the detection results of the flow sensor 60 and the control of the pump 50 based on the detection results of the flow switch 70.

(4-4)

In the temperature-adjusting fluid supply apparatus 100, the flow sensor 60 outputs the detection results of the flow rate of the temperature-adjusting fluid in an analog format. The flow switch 70 outputs the detection results of the flow rate of the temperature-adjusting fluid in a binary format.

Therefore, the flow rate of the temperature-adjusting fluid can be detected with better precision with the flow sensor 60, and the flow switch 70 can detect whether or not the flow rate is equal to or greater than a predetermined rate.

(4-5)

The temperature-adjusting fluid supply apparatus 100 is installed outdoors. Therefore, the temperature of the temperature-adjusting fluid is likely to be low when the outside air temperature is low.

However, because the control of the pump 50 based on the detection results of the flow sensor 60 and the control of the pump 50 based on the detection results of the flow switch 70 are switched therebetween on the basis of the temperature of the temperature-adjusting fluid, the pump 50 can be appropriately controlled to prevent the temperature-adjusting fluid from freezing in the pipes.

(5) Modifications

Modifications of the above embodiments are presented below. The modifications may be combined as appropriate as long as they do not contradict each other.

(5-1) Modification A

In the above embodiment, the temperature-adjusting fluid supply apparatus 100 has a compressor 11, a switching mechanism 12, a heat-source-side heat exchanger 13, and an expansion valve 14 configuring a refrigeration cycle, but no limitation is provided thereby. For example, the temperature-adjusting fluid supply apparatus 100 may be configured so that the usage-side heat exchanger 20 receives the supply of refrigerant from a separate unit having a compressor, a switching mechanism, a heat-source-side heat exchanger, and an expansion valve configuring a refrigeration cycle, and refrigerant passing through and exiting the usage-side heat exchanger 20 is returned to the separate unit.

(5-2) Modification B

In the above embodiment, a flow switch 70, which outputs the detection results of the flow rate of the temperature-adjusting fluid in a binary format, is used as the second flow rate detection means, but no limitation is provided thereby. For example, the second flow rate detection means may be a sensor that is less effected on detection accuracy by the viscosity changes in the temperature-adjusting fluid than the flow sensor 60, and that outputs the detection results of the flow rate of the temperature-adjusting fluid in an analog format.

(5-3) Modification C

In the above embodiment, the flow sensor 60 and the flow switch 70 are both arranged in the supply tube 32, but no limitation is provided thereby. One or both of the flow sensor 60 and the flow switch 70 may be arranged in the return tube 42. However, to suppress the effect of viscosity changes in the temperature-adjusting fluid on detection accuracy, the flow sensor 60 and the flow switch 70 are preferably arranged at locations where the temperature of the temperature-adjusting fluid is likely to be maintained at a higher temperature than in the return tube 42.

The positional relationship of the flow sensor 60, the flow switch 70, and the pump 50 is not limited to that shown in FIG. 1 (the order of the flow sensor 60, the pump 50, and the flow switch 70 from the upstream side in the flow direction of the temperature-adjusting fluid).

For example, the flow switch 70 may be placed upstream of the pump 50, and may be placed upstream of the flow sensor 60.

The flow sensor 60 may also be placed downstream of the pump 50. However, when there is a possibility that the detection accuracy of the flow sensor 60 will be affected if the flow sensor 60 is disposed in proximity to and downstream of the pump 50, such as when a vortex flowmeter is used as the flow sensor 60, the flow sensor 60 is preferably disposed upstream of the pump 50.

(5-4) Modification D

In the above embodiment, the temperature sensor 80 is installed in the supply tube 32, but is not limited thereto, and may be installed in, e.g., the return tube 42. However, to perceive the state of the temperature-adjusting fluid of which the flow rate is detected by the flow sensor 60 and the flow switch 70 and thereby appropriately control the pump 50, the temperature sensor 80 is preferably installed in the same supply tube 32 in which the flow sensor 60 and the flow switch 70 are installed.

The temperature sensor 80 need not be installed between the flow sensor 60 and the usage-side heat exchanger 20, and may be installed in another location of the supply tube 32 (for example, on the downstream side of the flow switch 70).

(5-5) Modification E

In the above embodiment, the thresholds $Tth1$, $Tth2$, which are used to determine whether to perform the control of the pump 50 based on the detection results of the flow sensor 60 or to perform the control of the pump 50 based on the detection results of the flow switch 70, are stored in advance in the memory of the control part 90, but no limitation is provided thereby.

For example, the thresholds $Tth1$, $Tth2$ may be written into the memory of the control part 90 via an input part (not shown). Additionally, for example, the configuration may be designed such that a plurality of thresholds for different types of temperature-adjusting fluids are stored in the memory of the control part 90, and the threshold that corresponds to the type of temperature-adjusting fluid (e.g., that corresponds to the type of temperature-adjusting fluid inputted via the input unit (not shown)) is used.

(5-6) Modification F

In the above embodiment, the temperature-adjusting fluid supply apparatus 100 is installed outdoors, but no limitation is provided thereby. The temperature-adjusting fluid supply apparatus 100 may be installed indoors. Even in such cases, for example, when parts of the forward external pipe 410 and/or the return external pipe 420 are installed outdoors and the temperature of the temperature-adjusting fluid tends to drop, freezing of the fluid for air-conditioning in the pipes is easily prevented by a configuration such as is described above.

(5-7) Modification G

In the above embodiment, the temperature-adjusting fluid flows through the supply tube 32 toward the air conditioner 430, which is the object to be adjusted for temperature, and temperature adjustment is performed using the heat of the temperature-adjusting fluid in the air conditioner 430 (temperature adjustment is performed on air that exchanges heat with the temperature-adjusting fluid in the air conditioner 430). However, the heat of the temperature-adjusting fluid flowing through the fluid circuit 300 of the temperature-adjusting fluid supply apparatus 100 may be used for temperature adjustment for the purposes other than air conditioning. For example, the temperature-adjusting fluid may be sent, through the supply tube 32, to a manufacturing process and/or a manufacturing apparatus that is the object to be adjusted for temperature in various manufacturing sites, for purposes such as temperature adjustment in the manufacturing process and/or cooling the manufacturing apparatus.

(5-8) Modification H

In the above embodiment, a case in which the temperature-adjusting fluid, heated in the usage-side heat exchanger 20, flows to an object to be adjusted for temperature is used as an example to describe switching between the control of the pump 50 based on the detection results of the flow sensor 60 and the control of the pump 50 based on the detection results of the flow switch 70, but this example is not provided by way of limitation. Switching between the control of the pump 50 based on the detection results of the flow sensor 60 and the control of the pump 50 based on the detection results of the flow switch 70 may be performed on the basis of the temperature of the temperature-adjusting fluid detected by the temperature sensor 80 when the temperature-adjusting fluid, after being cooled in the usage-side heat exchanger 20, flows to the object to be adjusted for temperature.

(5-9) Modification I

In the above embodiment, the control of the pump 50 based on the detection results of the flow sensor 60 and the control of the pump 50 based on the detection results of the flow switch 70 are used in order to flow the temperature-adjusting fluid through the fluid circuit 300 at the minimum allowable flow rate Fmin, but this example is not provided by way of limitation. The control of the pump 50 based on the detection results of the flow sensor 60 and the control of the pump 50 based on the detection results of the flow switch 70 can be widely applied to cases in which the pump 50 is controlled according to the amount of the temperature-adjusting fluid flowing in the fluid circuit 300.

INDUSTRIAL APPLICABILITY

The present invention is widely applicable and useful in temperature-adjusting fluid supply apparatuses that, using a pump capable of adjusting the flow rate, cause a fluid for temperature adjustment to be circulated between a heat exchanger that transfers heat supplied from a refrigerant to the fluid, and an object to be adjusted for temperature that uses the heat of the fluid.

REFERENCE SIGNS LIST

20 Usage-side heat exchanger (Heat exchanger)
32 Supply tube
42 Return tube
50 Pump
60 Flow sensor (First flow rate detection means)
70 Flow switch (Second flow rate detection means)
80 Temperature sensor (Temperature detection means)
90 Control part
100 Temperature-adjusting fluid supply apparatus

CITATION LIST

Patent Literature

[Patent Literature 1] Japanese Laid-open Patent Application No. 2010-144963

The invention claimed is:

1. A temperature-adjusting fluid supply apparatus comprising:
   a heat exchanger transferring heat supplied from a refrigerant to a fluid for temperature adjustment;
   a supply tube through which the fluid flows from the heat exchanger toward an object to be adjusted for temperature;
   a return tube through which the fluid returning from the object to be adjusted for temperature flows;
   a pump arranged in the supply tube or the return tube and being flow rate adjustable;
   a flow sensor arranged in the supply tube or the return tube and detecting the flow rate of the fluid;
   a flow switch arranged in the supply tube or the return tube in series with the flow sensor,
   a detection accuracy of the flow switch being less affected by viscosity changes in the fluid than the flow sensor;
   a temperature sensor detecting the temperature of the fluid; and
   a controller switching, on the basis of the temperature of the fluid detected by the temperature sensor, between control of the pump based on the detection results of the first flow sensor and control of the pump based on the detection results of the flow switch,
   wherein the flow sensor detects flow rate as a continuous numerical value whereas the flow switch detects whether or not the flow rate is equal or greater than a predetermined flow rate.

2. The temperature-adjusting fluid supply apparatus according to claim 1, wherein the flow sensor and the flow switch are arranged in the supply tube.

3. The temperature-adjusting fluid supply apparatus according to claim 2, wherein the temperature sensor detects the temperature of the fluid flowing through the supply tube.

4. The temperature-adjusting fluid supply apparatus according to claim 1, wherein the flow sensor outputs the detection results of the flow rate of the fluid in an analog format; and
   the flow switch outputs the detection results of the flow rate of the fluid in a binary format.

5. The temperature-adjusting fluid supply apparatus according to claim 1, wherein the temperature-adjusting fluid supply apparatus is installed outdoors.

6. The temperature-adjusting fluid supply apparatus according to claim 2, wherein the flow sensor outputs the detection results of the flow rate of the fluid in an analog format; and
   the flow switch outputs the detection results of the flow rate of the fluid in a binary format.

7. The temperature-adjusting fluid supply apparatus according to claim 3, wherein the flow sensor outputs the detection results of the flow rate of the fluid in an analog format; and
   the flow switch outputs the detection results of the flow rate of the fluid in a binary format.

8. The temperature-adjusting fluid supply apparatus according to claim 2, wherein the temperature-adjusting fluid supply apparatus is installed outdoors.

9. The temperature-adjusting fluid supply apparatus according to claim 3, wherein the temperature-adjusting fluid supply apparatus is installed outdoors.

10. The temperature-adjusting fluid supply apparatus according to claim 4, wherein the temperature-adjusting fluid supply apparatus is installed outdoors.

* * * * *